(12) United States Patent
Kim

(10) Patent No.: US 11,888,336 B1
(45) Date of Patent: Jan. 30, 2024

(54) SYSTEM AND METHOD FOR CHARGING AND STACKING ELECTRIC TRANSPORT DEVICES

(71) Applicant: Honda Motor Co., Ltd., Tokyo (JP)

(72) Inventor: Michael Kim, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/181,725

(22) Filed: Mar. 10, 2023

Related U.S. Application Data

(63) Continuation of application No. 17/005,889, filed on Aug. 28, 2020, now abandoned.

(51) Int. Cl.
*H02J 7/00* (2006.01)
*B60R 16/033* (2006.01)

(52) U.S. Cl.
CPC .......... *H02J 7/0045* (2013.01); *B60R 16/033* (2013.01); *H02J 7/0013* (2013.01)

(58) Field of Classification Search
CPC .................................................. H02J 7/0045
USPC ......................................................... 320/107
See application file for complete search history.

(56) References Cited

U.S. PATENT DOCUMENTS

| | | | |
|---|---|---|---|
| 6,326,765 B1 * | 12/2001 | Hughes | B62M 7/12 320/104 |
| 8,706,331 B2 | 4/2014 | Meyers | |
| 9,661,905 B2 | 5/2017 | O'Donnell et al. | |
| 10,038,332 B1 | 7/2018 | Leabman et al. | |
| 10,086,895 B1 | 10/2018 | Melamed | |
| 10,543,752 B2 | 1/2020 | Moravick et al. | |
| 10,749,218 B2 * | 8/2020 | Hawley | H02M 3/1584 |

(Continued)

FOREIGN PATENT DOCUMENTS

| | | |
|---|---|---|
| CN | 105799839 B | 5/2018 |
| CN | 209228152 U | 8/2019 |

(Continued)

OTHER PUBLICATIONS

Williams, Martyn; pcworld.com; "Riding Modobag, the motorized suitcase," Aug. 15, 2016, 6 pp [online]; [retrieved on Sep. 2, 2020]; https://www.pcworld.com/article/3107617/riding-modobag-the-motorized-suitcase.html.

(Continued)

*Primary Examiner* — Yalkew Fantu
(74) *Attorney, Agent, or Firm* — Plumsea Law Group, LLC

(57) ABSTRACT

A system and method for charging and stacking electric transport devices is described. In one embodiment, an electric transport device charging system includes a charging mat including a plurality of charging terminals. The plurality of charging terminals have a first shape. The system also includes a plurality of electric transport devices. Each electric transport device has a pair of side surfaces including a plurality of connection points. The connection points on one of the side surfaces having a second shape that is configured to conform to the first shape of the plurality of charging terminals. A first electric transport device of the plurality of electric transport devices is configured to be placed on the charging mat with the plurality of charging terminals aligned with the connection points on one of the side surfaces having the second shape such that the connection points and the charging terminals fit into each other.

20 Claims, 13 Drawing Sheets

(56) References Cited

U.S. PATENT DOCUMENTS

| | | | |
|---|---|---|---|
| 2005/0173175 A1* | 8/2005 | Lee | B62K 15/008 |
| | | | 180/208 |
| 2015/0303727 A1 | 10/2015 | Jeong et al. | |
| 2015/0326060 A1 | 11/2015 | Young | |
| 2016/0244246 A1* | 8/2016 | Gerencsér | B62K 15/008 |
| 2018/0116361 A1 | 5/2018 | Anjum et al. | |
| 2019/0131797 A1 | 5/2019 | Chen et al. | |
| 2019/0245365 A1 | 8/2019 | Moghaddam et al. | |
| 2020/0139835 A1 | 5/2020 | Miler | |
| 2020/0207225 A1 | 7/2020 | Barbosa, Jr. et al. | |

FOREIGN PATENT DOCUMENTS

| | | |
|---|---|---|
| CN | 210000475 U | 1/2020 |
| WO | 2014101627 A1 | 7/2014 |
| WO | 2018094861 A1 | 5/2018 |
| WO | 2018125921 A1 | 7/2018 |
| WO | 2019000844 A1 | 1/2019 |

OTHER PUBLICATIONS

SilverStone Technology Co., Ltd.; QIB052-D, 4 pp [online]; [retrieved on Sep. 2, 2020]; https://www.silverstonetek.com/product.php?pid=725&area=en.

SilverStone Technology Co., Ltd.; Mobile Accessories QIB052 / QIB052-D Manual, 32 pp [online]; [retrieved on Sep. 2, 2020]; https://www.silverstonetek.com/downloads/Manual/accessories/Multi-QIB052-QIB052-D-Manual.pdf.

\* cited by examiner

SYSTEM AND METHOD FOR CHARGING AND STACKING ELECTRIC TRANSPORT DEVICES

CROSS-REFERENCE TO RELATED APPLICATION

This application is a continuation of and claims benefit to U.S. patent application Ser. No. 17/005,889, filed on Aug. 28, 2020 and titled "System and Method for Charging and Stacking Electric Transport Devices", the disclosure of which application is incorporated by reference herein in its entirety.

BACKGROUND

This disclosure relates generally to vehicles, and in particular to a system and method for charging and stacking electric transport devices.

With rising prices of gasoline and automobiles, many people may turn to other more cost efficient modes of transportation such as, for example, mopeds, bicycles, scooters and, more recently, electric personal transport devices, such as electric scooters. These electric transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Accordingly, there is a need in the art for an improved system and method for efficiently charging and storing electric transport devices.

SUMMARY

In one aspect, an electric transport device charging system is provided. The system includes a charging mat including a plurality of charging terminals. The plurality of charging terminals have a first shape. The system also includes a plurality of electric transport devices. Each electric transport device has a pair of side surfaces including a plurality of connection points. The connection points on one of the side surfaces having a second shape that is configured to conform to the first shape of the plurality of charging terminals. A first electric transport device of the plurality of electric transport devices is configured to be placed on the charging mat with the plurality of charging terminals aligned with the connection points on one of the side surfaces having the second shape such that the connection points and the charging terminals fit into each other.

In another aspect, a method of charging and stacking a plurality of electric transport devices is provided. The method includes providing a charging mat having a plurality of charging terminals. The plurality of charging terminals have a first shape. The method also includes placing two or more electric transport devices on top of the charging mat in a stacked arrangement. Each electric transport device has a pair of side surfaces including a plurality of connection points. The connection points on one of the side surfaces having a second shape that is configured to conform to the first shape of the plurality of charging terminals. Placing the two or more electric transport devices on the charging mat includes aligning the plurality of charging terminals on the charging mat with the connection points of a first electric transport device located on one of the side surfaces having the second shape such that the connection points of the first electric transport device and the charging terminals fit into each other. Placing the two or more electric transport devices on the charging mat also includes stacking at least one additional electric transport device on top of the first electric transport device.

In another aspect, an electric transport device is provided. The electric transport device includes an outer casing including a pair of side surfaces, an onboard battery, a front wheel and a rear wheel, at least one of the front wheel or the rear wheel including an electric motor, and a plurality of connection points located on each of the side surfaces. The connection points on one side surface have a first shape and the connection points on the opposite side surface have a second shape that is configured to conform to the first shape. The onboard battery is electrically connected to the connection points so as to be charged when the connection points are in contact with a charging source.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Methods and systems for charging and stacking electric transport devices are described herein. The techniques of the present embodiments may be used to allow multiple electric transport devices to be stacked on top of one another in an arrangement that also allows one or more of the electric transport devices to be charged while in the stacked arrangement.

The example embodiments are described herein with reference to an electric transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of electric transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a width. In addition, the electric scooter of the present embodiments has a thickness that is substantially smaller than the length and/or width of the electric scooter. In the example embodiments, the electric scooter may be transitioned from a stowed configuration in which components of the electric scooter are stored or disposed inside the rectangular outer casing to a riding configuration in which components of the electric scooter are folded or opened from their stored positions to extended positions outside of the outer casing so that the electric scooter may be operated or ridden by a user.

The present embodiments allow for one or more electric scooters to be stacked on top of one another in the stowed configuration for easy storage and/or transportation, while also allowing one or more of the electric scooters to be charged when stacked.

Figure 1:
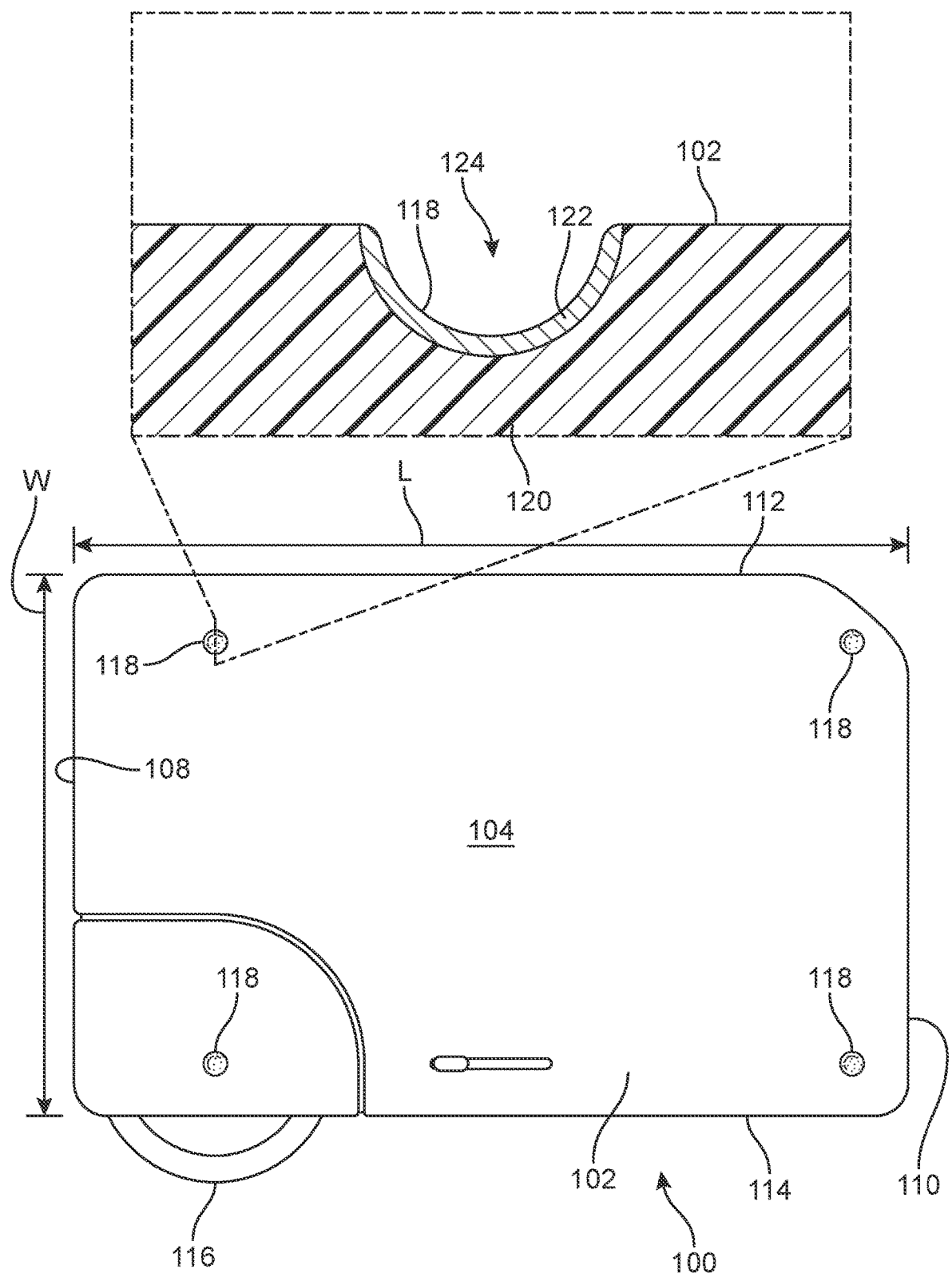
FIG. 1 is a representative view of one side of an example embodiment of an electric transport device in the form of an electric scooter in accordance with aspects of the present disclosure.
Figure 2:
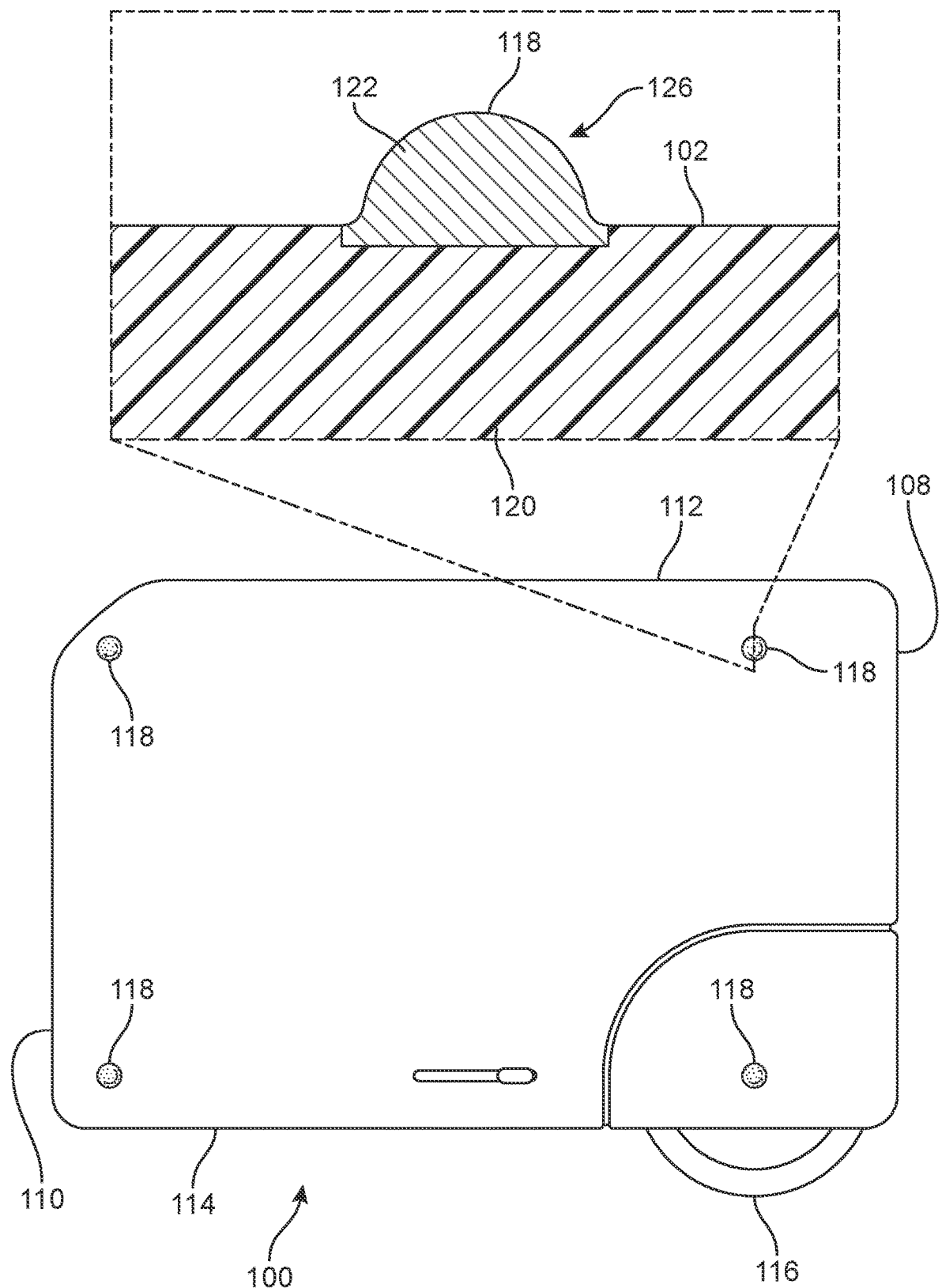
FIG. 2 is a representative view of an opposite side of the example embodiment of the electric scooter in accordance with aspects of the present disclosure.

Referring now to FIGS. 1 and 2, an example embodiment of an electric scooter 100 is shown. In some embodiments, electric scooter 100 may be transitioned between a stowed configuration in which components of electric scooter 100 are stored or disposed inside an outer casing 102 to a riding configuration in which components of electric scooter 100 are folded or opened from their stored positions to extended positions outside of outer casing 102 so that electric scooter 100 may be operated or ridden by a user. As shown in FIG. 1, electric scooter 100 is in the stowed configuration.

In this embodiment, electric scooter 100 has an approximately rectangular shape defined by outer casing 102 having a length (L) that is longer than a width (W). Outer casing 102 includes a first side surface 104 (shown in FIG. 1) and an opposite second side surface 106 (shown in FIG. 2). In an example embodiment, side surfaces of outer casing 102 are substantially flat, including each of first side surface 104 and second side surface 106. Outer casing 102 of electric scooter 102 extends between a front edge 108 and an opposite rear edge 110, as well as a top edge 112 and an opposite bottom edge 114. Front edge 108, rear edge 110, top edge 112, and bottom edge 114 are substantially straight and define an outer perimeter of rectangular-shaped outer housing 102 of electric scooter 100.

In this embodiment, a front wheel 116 is visible along bottom side 114 of electric scooter 100 near front edge 108. Electric scooter 100 also includes a rear wheel 306 (shown in FIG. 3 below) that is disposed inside outer casing 102 (i.e., in the stowed configuration as shown in FIGS. 1 and 2) along bottom edge 114 near rear edge 110.

In an example embodiment, electric scooter 100 may include a plurality of connection points 118. Connections points 118 are configured to allow electric scooter 100 to be charged. That is, connection points 118 are electrically connected to at least one battery disposed within electric scooter 100 (i.e., inside outer casing 102). Connection points 118 are also configured to allow multiple electric transport devices (e.g., electric scooter 100) to be stacked on top of one another on their side surfaces (e.g., one of first side surface 104 and second side surface 106) such that connection points 118 on adjacent side surfaces are aligned with each other.

In an example embodiment, outer casing 102 of electric scooter 100 may be made of a first material 120 and connection points 118 may be made of a second material 122 that is different than first material 120. For example, in one embodiment, first material 120 forming outer casing 102 is made of an impact resistant plastic or polymer and second material 122 forming connection points 118 is made of an electrically conductive material, such as metals including nickel, iron, steel, as well as various alloys and combinations thereof. With this arrangement, connection points 118 are able to conduct electricity from a charging source to an internal battery in electric scooter 100 so that electric scooter 100 may be charged. It should be understood that other materials may alternatively or additionally be used.

In an example embodiment, connection points 118 on opposite side surfaces may have conforming or corresponding shapes such that connection points on one side surface of an electric transport device mate with or fit into the conforming or corresponding connection point on the side surface of the adjacent electric transport device facing towards it. For example, in one embodiment, connections points 118 may be configured with a concave shape on one side surface of the electric transport device and may be configured with a conforming or coincident convex shape on the opposite side surface. With this configuration, multiple electric transport devices may be stacked on top of one another by arranging the side surfaces of each electric transport device such that concave shaped connection points are mated or fitted with corresponding convex shaped connection points.

By mating or fitting the connection points of adjacent side surfaces of the electric transport devices in this manner, electric charge may pass through each connection point to the connection point of the adjacent electric transport device. With this arrangement, multiple electric transport devices may be charged while in a stacked arrangement. Additionally, the conforming or corresponding shapes of the connection points create a mechanical attachment through friction that keeps the electric transport devices in the stacked arrangement during storage and/or transport.

In the example embodiment shown in FIG. 1, connection points 118 on first side surface 104 of electric scooter 100 have a concave shape 124. That is, connection points 118 on first side surface 104 are a depression or recess in the otherwise flat surface of first side surface 104. In contrast, connection points 118 on second side surface 106 of electric scooter 100 shown in FIG. 2 (i.e., on the opposite side of electric scooter 100) have a convex shape 126. That is, connection points 118 on second side surface 106 are raised or extend above the otherwise flat surface of second side surface 104. In the example embodiments, connection points 118 have corresponding concave and convex semi-hemispherical shapes (i.e., recesses and domes).

Figure 3:
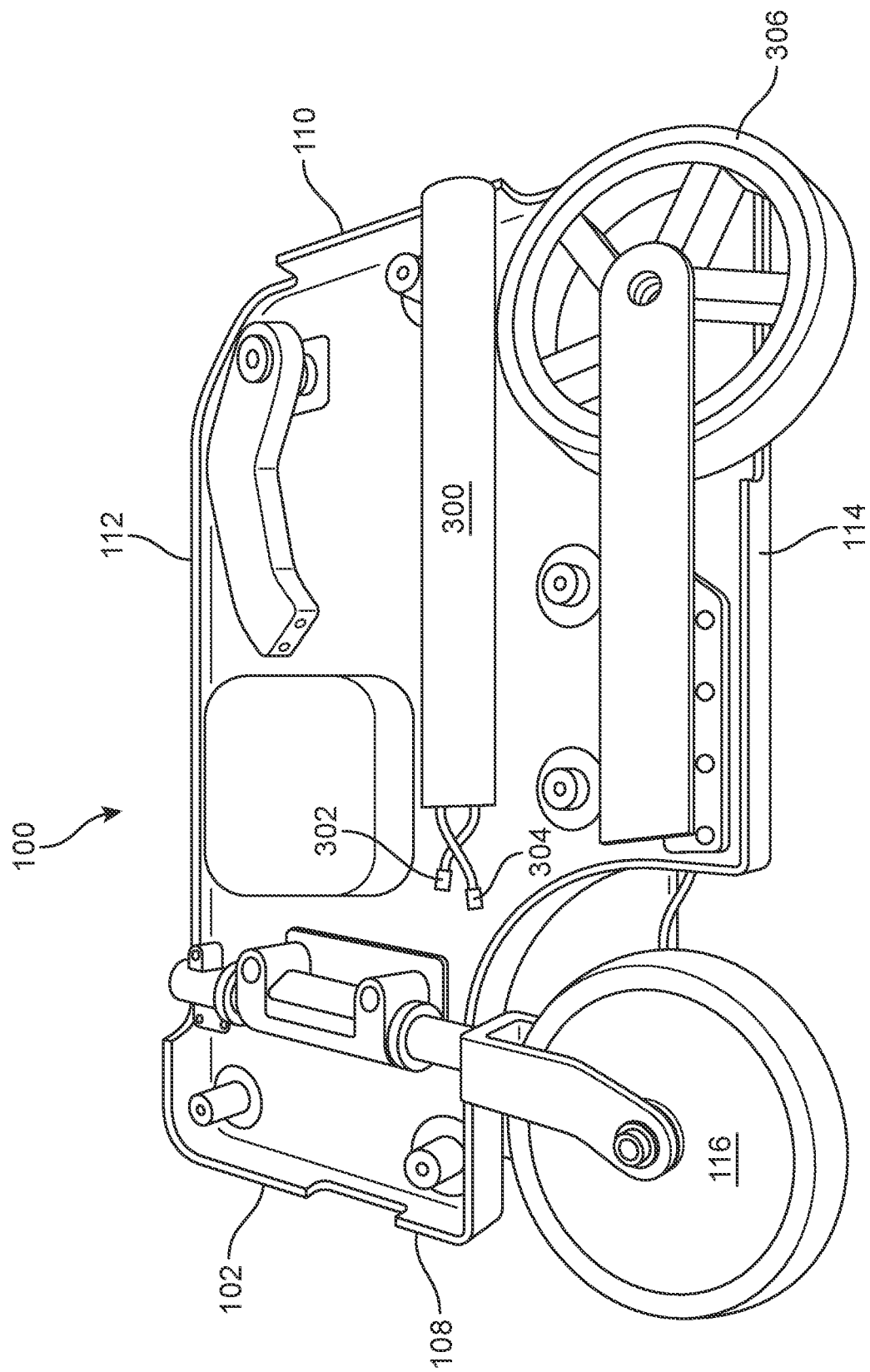
FIG. 3 is a representative view of internal components of the example embodiment of the electric scooter in accordance with aspects of the present disclosure.

Referring now to FIG. 3, a representative view of the internal components of electric scooter 100 is shown. In this embodiment, a battery 300 is disposed approximately within the middle portion of electric scooter 100. Battery 300 provides an electrical charge to a power source, such as a motor, that drives one or more wheels of electric scooter 100, including front wheel 116 and/or rear wheel 306. For example, in one embodiment, an electric motor may be integrated into front wheel 116 of electric scooter 100 (e.g., in the hub of front wheel 116). In such embodiments, battery 300 may provide electricity to power the electric motor in front wheel 116. In other embodiments, an electric motor may be located elsewhere within the interior of electric scooter 100, including as a separate component apart from front wheel 116. In addition, in some cases, the electric motor may be configured to drive a single wheel (e.g., one of front wheel 116 or rear wheel 306) or both wheels (e.g., front wheel 116 and rear wheel 306) of electric scooter 100. In still other cases, each wheel (e.g., front wheel 116 and rear wheel 306) may be provided with an independent electric motor to drive its respective wheel of electric scooter 100.

In this embodiment, battery 300 is shown with at least two electric leads, including a positive lead 302 and a negative lead 304. Positive lead 302 and negative lead 304 are each configured to be electrically connected, such as by electrical wire, to a pair of connection points 118 of electric scooter 100 so that battery 300 may be charged when the corresponding positive and negative pairs of connection points are electrically connected to a charging source (e.g., a charging mat as will be described below). In the view shown in FIG. 3, positive lead 302 and negative lead 304 are shown detached from the wires that connect battery 300 with the pairs of positive and negative connection points 118 for purposes of ease of illustration. However, it should be understood that when electric scooter 100 is configured for use, battery 300 will be electrically connected to connection points 118, as well as to the electric motor(s) configured to provide motive force to one or more wheels of electric scooter 100, such as front wheel 116 and/or rear wheel 306.

Figure 4:
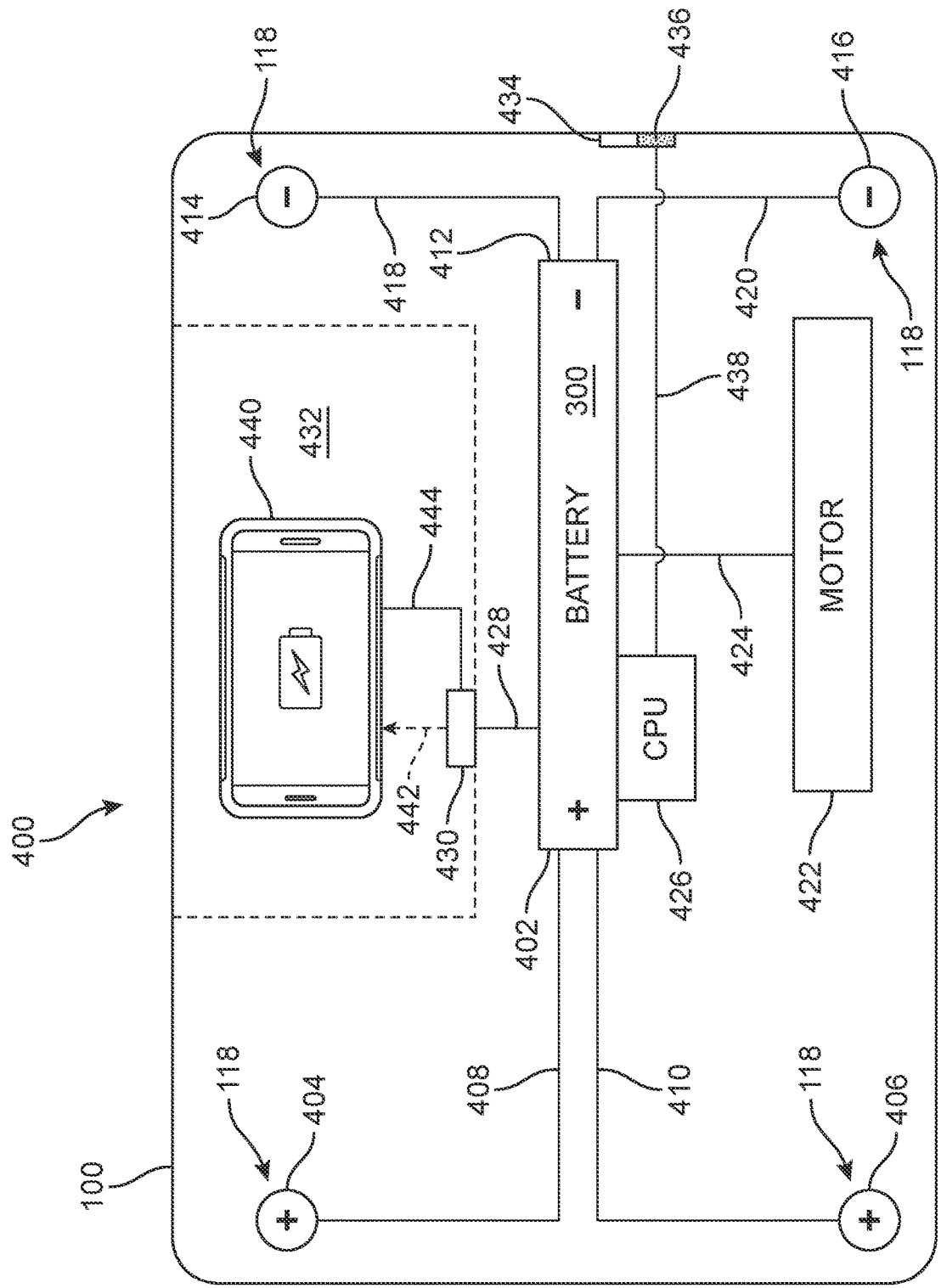
FIG. 4 is a schematic block diagram of an electrical system of the example embodiment of the electric scooter in accordance with aspects of the present disclosure.

Referring now to FIG. 4, a schematic diagram of an electrical system 400 of electric scooter 100 is shown. It should be understood that the schematic view of electrical system 400 shown in FIG. 4 illustrates the electrical connections between various components of electric scooter 100 and may have different configurations and/or placements of components in various embodiments of electric scooter 100.

In this embodiment, battery 300 is configured to supply electric power to components of electric scooter 100. Battery 300 includes a positive terminal 402 (which may be connected to positive lead 302) and a negative terminal 412 (which may be connected to negative lead 304). According to the example embodiments described herein, battery 300 is configured to be charged via plurality of connection points 118.

In an example embodiment, electrical system 400 includes a pair of positive connection points 118, including a first positive connection point 404 and a second positive connection point 406. First positive connection point 404 is electrically connected to positive terminal 402 of battery 300 via a wire 408. Second positive connection point 406 is electrically connected to positive terminal 402 of battery 300 via a wire 410. In some embodiments, wires 408, 410 may electrically connect first positive connection point 404 and second positive connection point 406 to positive terminal 402 of battery 300 via a connection to positive lead 302. For example, positive lead 302 may include a connector on its free end (i.e., the end not connected to battery 300) that allows wires 408, 410 to be removably connected with positive lead 302 so that battery 300 may be removed and/or replaced.

Electrical system 400 also includes a pair of negative connection points 118, including a first negative connection point 414 and a second negative connection point 416. First negative connection point 414 is electrically connected to negative terminal 412 of battery 300 via a wire 418. Second negative connection point 416 is electrically connected to negative terminal 412 of battery 300 via a wire 420. In some embodiments, wires 418, 420 may electrically connect first negative connection point 414 and second negative connection point 416 to negative terminal 412 of battery 300 via a connection to negative lead 304. For example, negative lead 304 may include a connector on its free end (i.e., the end not connected to battery 300) that allows wires 418, 420 to be removably connected with negative lead 304 so that battery 300 may be removed and/or replaced.

In some embodiments, battery 300 may be electrically connected to other components of electric scooter 100. In one embodiment, battery 300 is electrically connected to at least one electric motor 422. In some embodiments, battery 300 may also be electrically connected to an auxiliary charging port 430 configured to charge small portable electronic devices (e.g., a mobile device 440). As shown in FIG. 4, auxiliary charging port 430 is disposed in a storage compartment 432 of electric scooter 100 (i.e., inside outer casing 102). Storage compartment 432 is a space inside outer casing 102 of electric scooter 100 located between the side surfaces (e.g., first side surface 104 and second side surface 106) that is configured to hold or store mobile device 440 or other objects.

In an example embodiment, when mobile device 440, such as a mobile phone or tablet, is placed within storage compartment 432, a battery of mobile device 440 may be charged using auxiliary charging port 430. For example, as shown in FIG. 4, a mobile device 440 may be placed in storage compartment 432 and its battery may be charged using auxiliary charging port 430. Auxiliary charging port 430 may charge the battery of mobile device 440 via a wireless charging connection 442 and/or via a wired charging connection 444. With this arrangement, a user may use battery 300 of electric scooter 100 to charge a battery of a small portable electric device, such as mobile device 440, when it is placed within storage compartment 432.

In this embodiment, electric motor 422 is connected to battery 300 via a wire 424 and auxiliary charging port 430 is connected to battery 300 via a wire 428. In some embodiments, a central processing unit (CPU) 426 may be provided as part of electrical system 400 to control one or more functions of battery 300, including monitoring and/or controlling charging of battery 300, as well as providing electric power to one or more components of electric scooter 100, such as electric motor 422 and/or an auxiliary charging port 430.

In one embodiment, electrical system 400 may further include a pass-through tab 434. Pass-through tab 434 includes a switch 436 that may be provided on a side of electric scooter 100 that allows a user to toggle electrical system 400 between a charging state (i.e., allowing connection points 118 to charge battery 300) with switch 436 in one position and a pass-through state (i.e., allowing connection points 118 to pass through electric to one or more adjacent electric scooters in contact via connection points 118) with switch 436 in another position. As shown in this embodiment, pass-through tab 434 is connected to CPU 426 of battery 300 via a wire 438 that allows the state of switch 436 to be communicated to CPU so as to control whether electrical system 400 allows battery 300 to charge or pass-through electric to other electric scooters. With this arrangement, when two or more electric scooters are in a stacked arrangement on top of a charging source (e.g., a charging mat as will be described below), pass-through tab 434 may allow a user designate which electric scooters should be charged.

Additionally, in some embodiments, pass-through tab 434 may be controlled between the charging state and the pass-through state by CPU 426, for example, based on information associated with the state of charge or charging capacity of battery 300. For example, CPU 426 may determine that if battery 300 has a state of charge below a threshold amount, then pass-through tab 434 may be controlled to a default charging state. Similarly, if CPU 426 determines that if battery 300 has a state of charge above a threshold amount, then pass-through tab 434 may be controlled to a default pass-through state. In either case, a user may manually move switch 436 of pass-through tab 434 to the desired position (e.g., charging state or pass-through state) to ensure which electric scooters are charged from the charging source.

Figure 5:
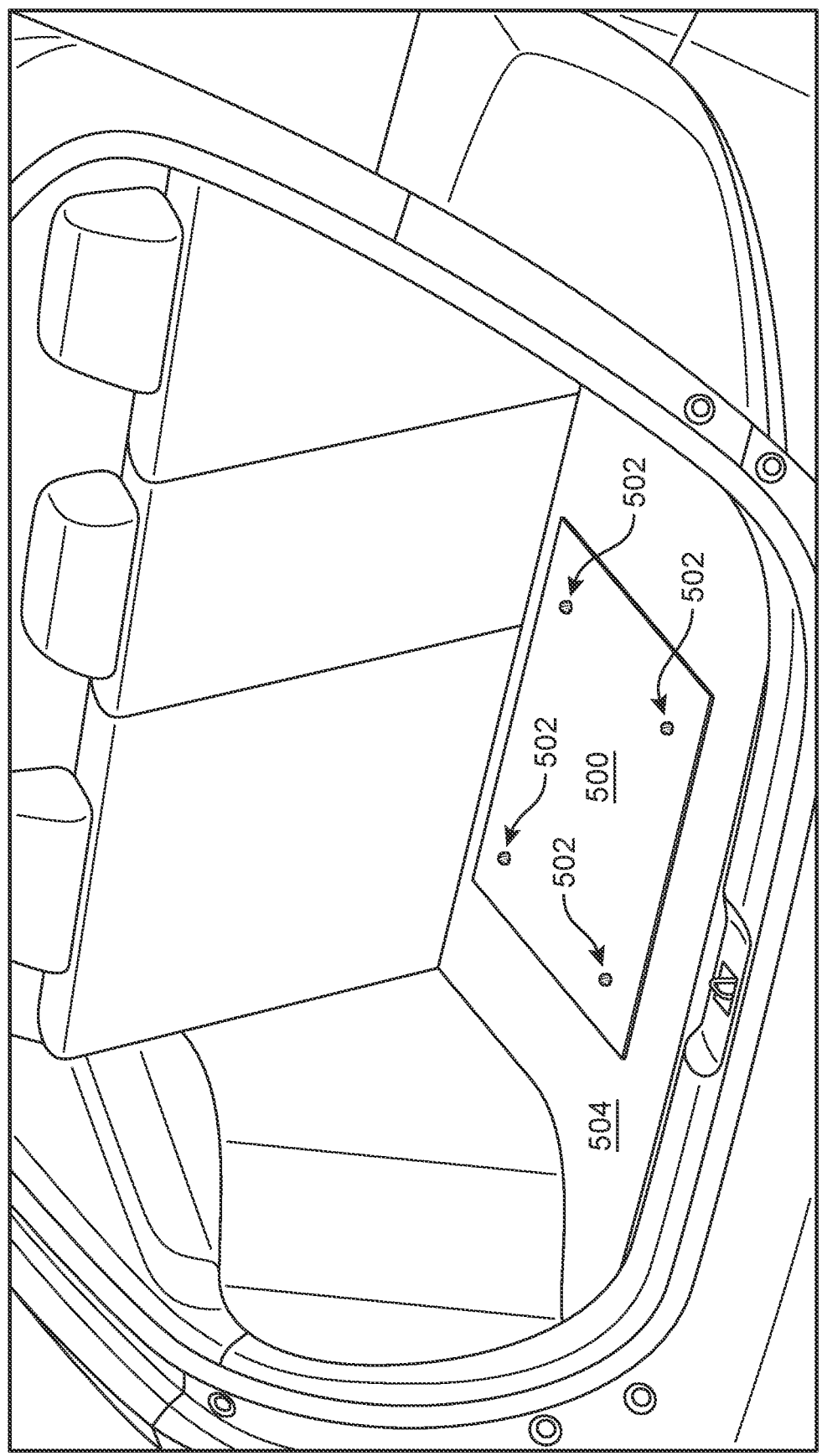
FIG. 5 is a representative view of an example embodiment of a charging mat disposed in a vehicle cargo area in accordance with aspects of the present disclosure.

In some embodiments, an electric transport device charging system includes a charging source that is provided to supply electric power to charge one or more electric transport devices (e.g., electric scooters). As described above, in many cases, a user of an electric transport device (e.g., electric scooter 100) may use the electric transport device for "last-mile" or "first-mile" portions of a trip to a destination. In these cases, the user may transport the electric transport device in their primary vehicle. In an example embodiment, an electric transport device charging system may include a charging source in the form of a charging mat that can be provided in the user's primary vehicle. Referring now to FIG. 5, an embodiment of an electric transport device charging system including a charging mat 500 disposed in a vehicle cargo area 504 of a vehicle is shown.

In this embodiment, the vehicle includes cargo area 504, such as a trunk or storage area, that has a substantially flat surface so that charging mat 500 may lie flat in cargo area 504. In an example embodiment, charging mat 500 may be electrically connected with an electrical system of the vehicle in which it is provided. For example, electric power may be provided from an on-board battery, alternator, generator, or motor (e.g., electric motor, hybrid motor, and/or combustion motor) and supplied to a plurality of charging terminals 502 of charging mat 500. With this arrangement, charging mat 500 may be used to charge one or more electric scooters (e.g., electric scooter 100).

Figure 6:
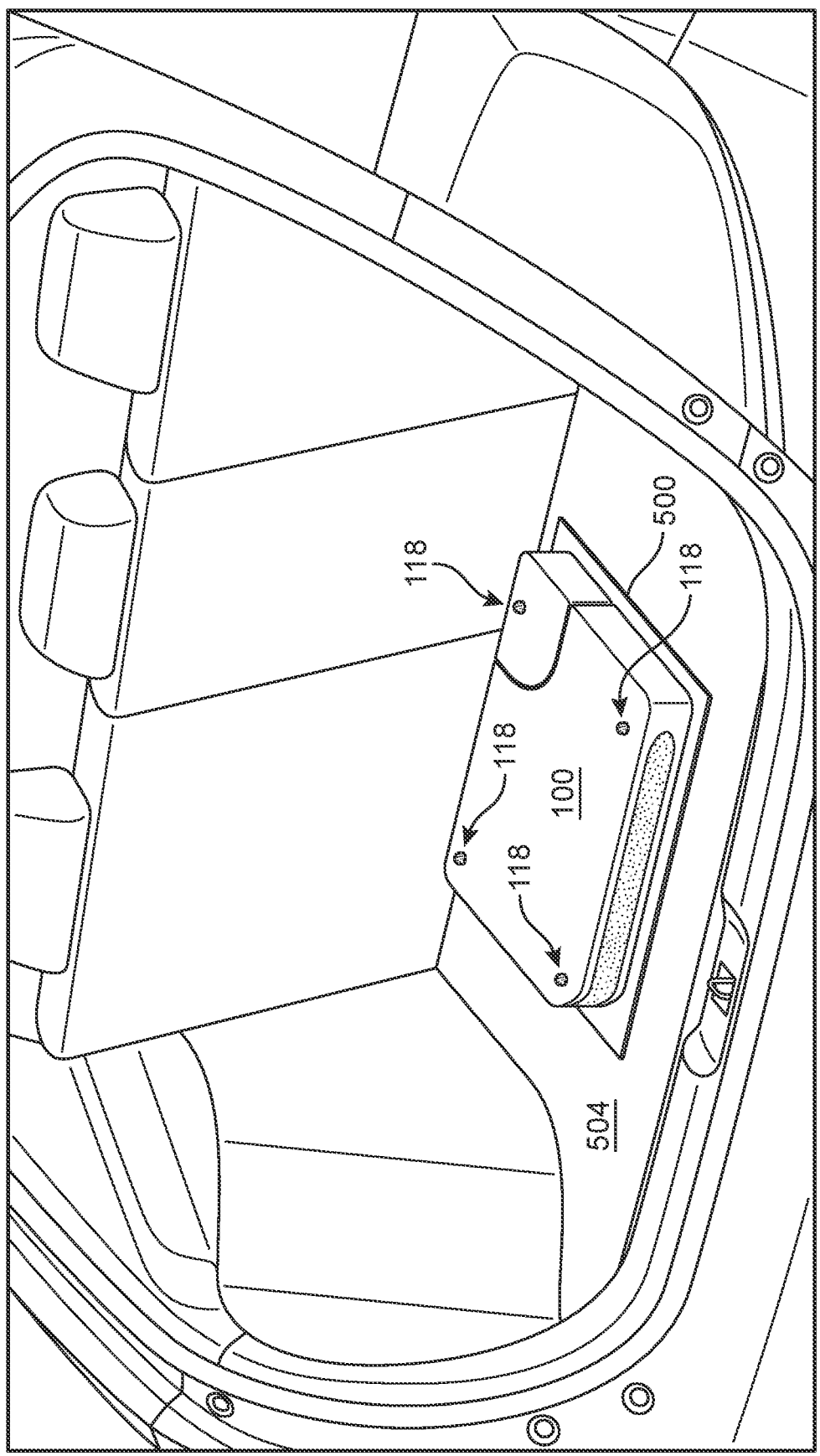
FIG. 6 is a representative view of an electric scooter being charged while stacked on the charging mat in accordance with aspects of the present disclosure.

In an example embodiment, charging mat 500 may be made of a first material, such as a rubber or polymer material, that may be electrically insulated. Charging terminals 502 may be made of a second material that is different from the first material and is electrically conductive, for example, any of the materials described above that may be used to form connection points 118 of electric scooter 100. For example, as shown in FIG. 6, charging terminals 502 of charging mat 500 may be brought into contact with connection points 118 of electric scooter 100 to charge battery 300 of electric scooter 100 using electric power from the vehicle in which charging mat 500 is disposed.

In an example embodiment, charging terminals 502 on charging mat 500 have a convex shape (e.g., convex shape 126) that is configured to fit or mate with a corresponding or conforming shape of the connection points of the electric scooter that is placed on top of charging mat 500. That is, charging terminals 502 on charging mat 500 are raised or extend above the otherwise flat surface of charging mat 500. Electric scooter 100 may be stacked or arranged on top of charging mat 500 such that the side surface of electric scooter 100 with connection points 118 having a concave shape (e.g., concave shape 124) is facing towards charging mat 500. With this arrangement, charging terminals 502 of charging mat 500 and connection points 118 of electric scooter 100 may mate or fit into one another so as to be electrically connected as well as mechanically attached through friction that keeps electric scooter 100 in the stacked arrangement on top of charging mat 500 during storage and/or transport in cargo area 504 of the vehicle.

Figure 7:
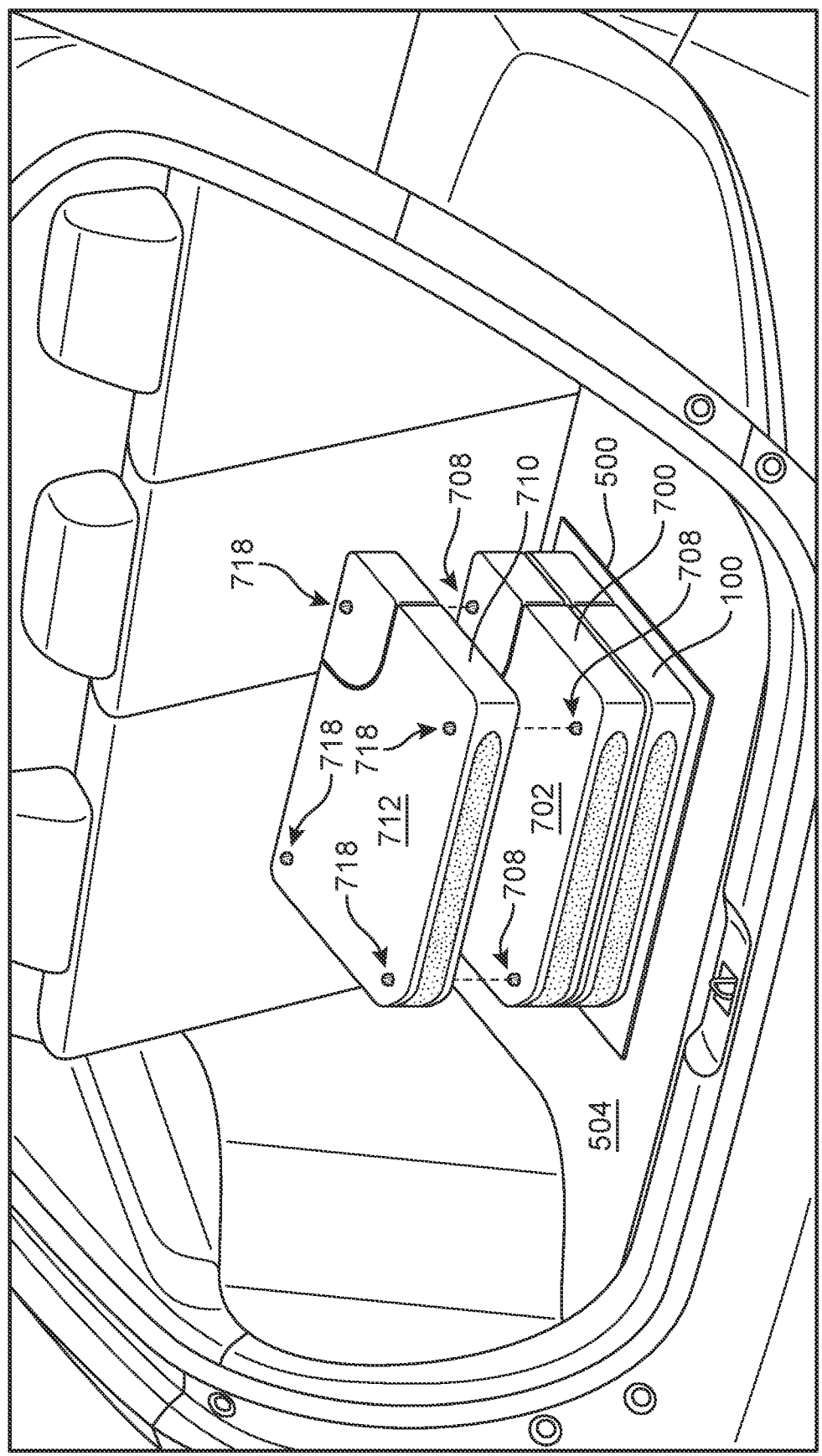
FIG. 7 is a representative view of multiple electric scooters in a stacked arrangement on the charging mat in accordance with aspects of the present disclosure.

In some embodiments, multiple electric scooters may be stacked on top of one another in the stowed configuration for easy storage and/or transportation, while also allowing one or more of the electric scooters to be charged when in the stacked arrangement. Referring now to FIG. 7, three electric scooters are shown in a stacked arrangement on charging mat 500 in cargo area 504 of a vehicle. In this embodiment, each electric scooter is substantially similar to electric scooter 100, described above. As shown in FIG. 7, electric scooter 100 is directly on top of charging mat 500 so that connection points 118 of electric scooter 100 are in contact with charging terminals 502 of charging mat 500. A second electric scooter 700 is stacked on top of electric scooter 100 such that the side surfaces of electric scooter 100 and second electric scooter 700 are facing towards each other.

In this embodiment, the side surfaces of electric scooter 100 and second electric scooter 700 include connection points having corresponding or conforming shapes. That is, connection points 118 on the side surface of electric scooter 100 facing towards the side surface of second electric scooter 700 may have a convex shape (e.g., convex shape 126) and connection points 708 on the side surface of second electric scooter 700 facing towards electric scooter 100 may have a concave shape (e.g., concave shape 124). With this arrangement, connection points 708 of second electric scooter 700 and connection points 118 of electric scooter 100 may mate or fit into one another so as to be both electrically connected as well as mechanically attached through friction that keeps the electric scooters in the stacked arrangement during storage and/or transport.

As shown in FIG. 7, a third electric scooter 710 may be stacked on top of second electric scooter 700 and electric scooter 100 on charging mat 500 in cargo area 504 of the vehicle. In this embodiment, third electric scooter 710 is stacked directly on top of second electric scooter 700 such that a side surface of third electric scooter 710 is facing towards a side surface 702 of second electric scooter 700 and an opposite side surface 712 is facing away from second electric scooter 700. In this embodiment, the side surfaces of third electric scooter 710 and second electric scooter 700 include connection points having corresponding or conforming shapes. That is, connection points 718 on the side surface of third electric scooter 710 facing towards side surface 702 of second electric scooter 700 may have a concave shape (e.g., concave shape 124) and connection points 708 on side surface 702 of second electric scooter 700 facing towards third electric scooter 710 may have a convex shape (e.g., convex shape 126). With this arrangement, connection points 708 of second electric scooter 700 and connection points 718 of third electric scooter 710 may mate or fit into one another so as to be both electrically connected as well as mechanically attached through friction that keeps the electric scooters in the stacked arrangement during storage and/or transport.

It should be understood that while FIG. 7 illustrates three electric scooters in a stacked arrangement on top of charging mat 500, any number of electric scooters may be stacked in a similar manner.

Figure 8:
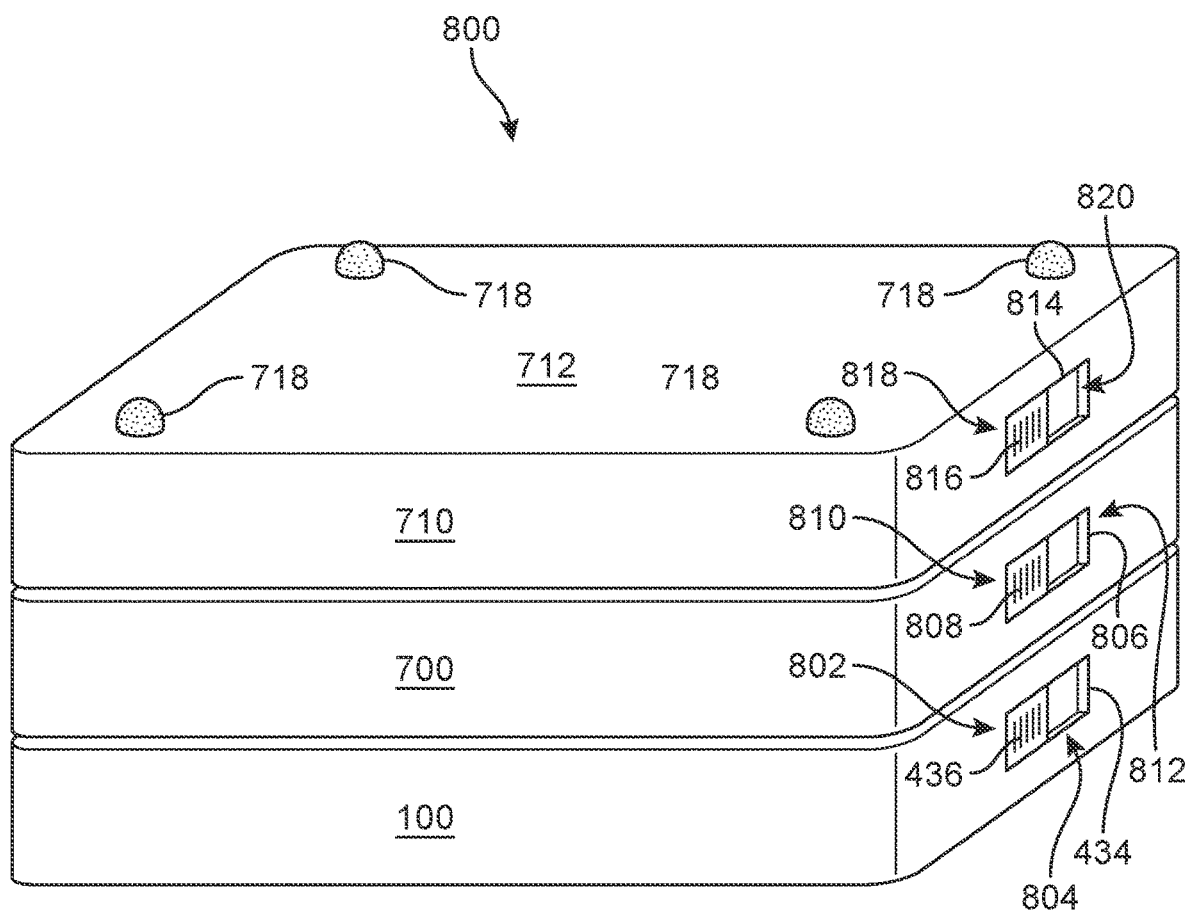
FIG. 8 is a schematic view of a stacked arrangement of multiple electric scooters in accordance with aspects of the present disclosure.

Referring now to FIG. 8, a schematic view of a stacked arrangement 800 of multiple electric scooters is shown. In this embodiment, stacked arrangement 800 includes the three electric scooters shown above, including electric scooter 100, second electric scooter 700, and third electric scooter 710. Each of the electric scooters are stacked with side surfaces facing towards the adjacent electric scooter. For example, electric scooter 100 is on the bottom, followed by second electric scooter 700 stacked on top of it, and third electric scooter 710 is stacked directly on top of second electric scooter 700.

As described above, in some embodiments, an electric scooter according to the techniques described herein may be provided with a pass-through tab to allow a user to control which electric scooter(s) in a stacked arrangement are to be charged by a charging source (e.g., charging mat 500). In this embodiment, electric scooter 100 includes pass-through tab 434 on one side that includes switch 436 that may be toggled between two positions, including a first position 802 associated with a charging state and a second position 804 associated with a pass-through state, as described above. Each of second electric scooter 700 and third electric scooter 710 may be provided with substantially similar pass-through tabs as pass-through tab 430.

For example, in this embodiment, second electric scooter 700 includes a pass-through tab 806 on one side that includes switch 808 that may be toggled between two positions, including a first position 810 associated with a charging state and a second position 812 associated with a pass-through state. Similarly, third electric scooter 710 also includes a pass-through tab 814 on one side that includes switch 816 that may be toggled between two positions, including a first position 818 associated with a charging state and a second position 820 associated with a pass-through state. With this arrangement, a user may selectively toggle switches 436, 808, 816 of one or more of pass-through tabs 430, 806, 814 to place each electric scooter 100, 700, 710 in either a charging state (i.e., allowing the connection points to charge the battery) or a pass-through state (i.e., allowing the connection points to pass through electric to one or more adjacent electric scooters in contact with the connection points).

Figure 9:
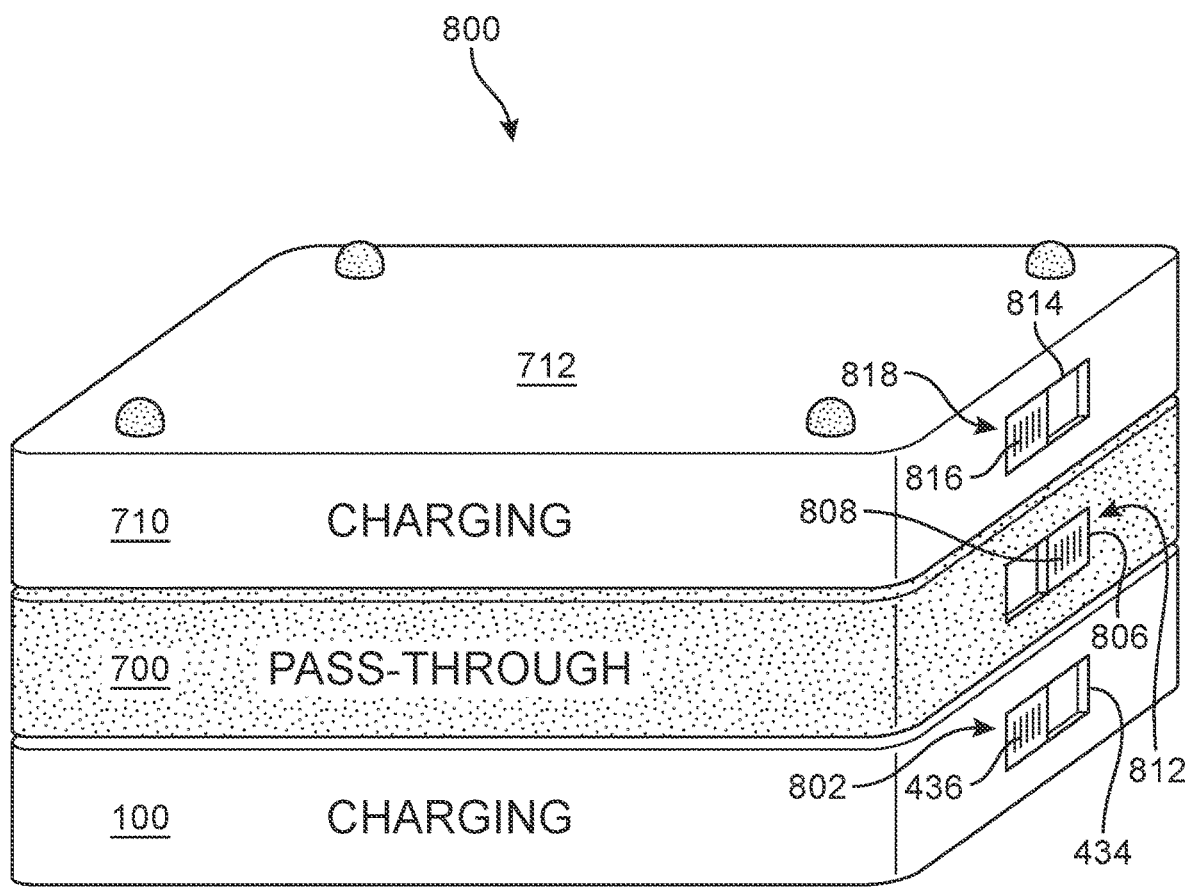
FIG. 9 is a schematic view of one or more of the electric scooters being charged while in the stacked arrangement in accordance with aspects of the present disclosure.

FIG. 9 is a schematic view of one or more of the electric scooters from FIG. 8 being charged while in stacked arrangement 800. In this embodiment, electric scooter 100 is in a charging state with switch 436 of pass-through tab 434 in first position 802. Second electric scooter 700 is in a pass-through state with switch 808 of pass-through tab 806 in second position 812. Third electric scooter 710 is also in a charging state with switch 816 of pass-through tab 814 in first position 818. Accordingly, electric from a charging source (e.g., charging mat 500, described above) will charge battery 300 of electric scooter 100, pass-through the connection points of second electric scooter 700 without charging its battery, and charge the battery of third electric scooter 710. Using pass-through tabs on the electric scooters allows a user to selectively choose which of the electric scooters in stacked arrangement 800 are to be charged and which are not to be charged.

Figure 10:
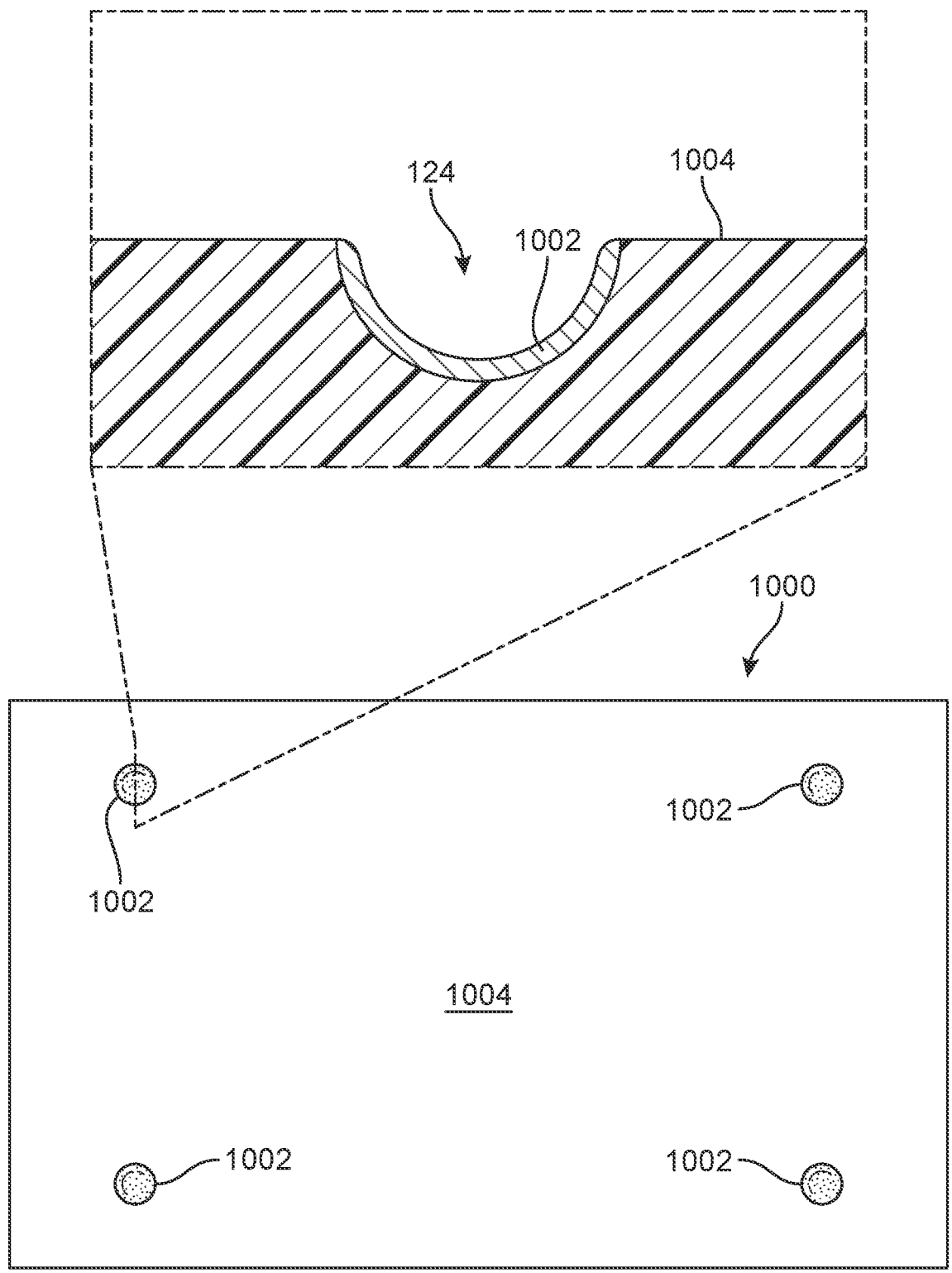
FIG. 10 is a representative view of an alternate embodiment of a charging mat with recessed charging terminals in accordance with aspects of the present disclosure.

FIG. 10 is a representative view of an alternate embodiment of a charging mat 1000 with recessed charging terminals 1002 in accordance with aspects of the present disclosure. In the previous embodiment of a charging mat (e.g., charging mat 500) the charging terminals (e.g., charging terminals 502) had a convex shape (e.g., convex shape 126) that was raised above the surface of the charging mat. In other embodiments, a charging mat without any raised portions may be desired. Accordingly, charging mat 1000 is provided with charging terminals 1002 that are recessed into a surface 1004 of charging mat 1000. For example, charging terminals 1002 of charging mat 1000 may have a concave shape (e.g., concave shape 124) that is recessed below surface 1004. With this arrangement, charging mat 1000 without raised portions may be provided in a cargo area of a vehicle so as to not otherwise interfere with objects placed in the cargo area when electric scooters are not being charged.

In addition, because concave shape 124 of charging terminals 1002 of charging mat 1000 correspond to the convex shape of the connection points (e.g., connection points 118) on the electric scooters, they may be similarly placed onto charging mat 1000 in a manner that creates a mechanical attachment through friction that to keep the electric scooter(s) in the stacked arrangement on charging mat 1000 during storage and/or transport within the vehicle.

Figure 11:
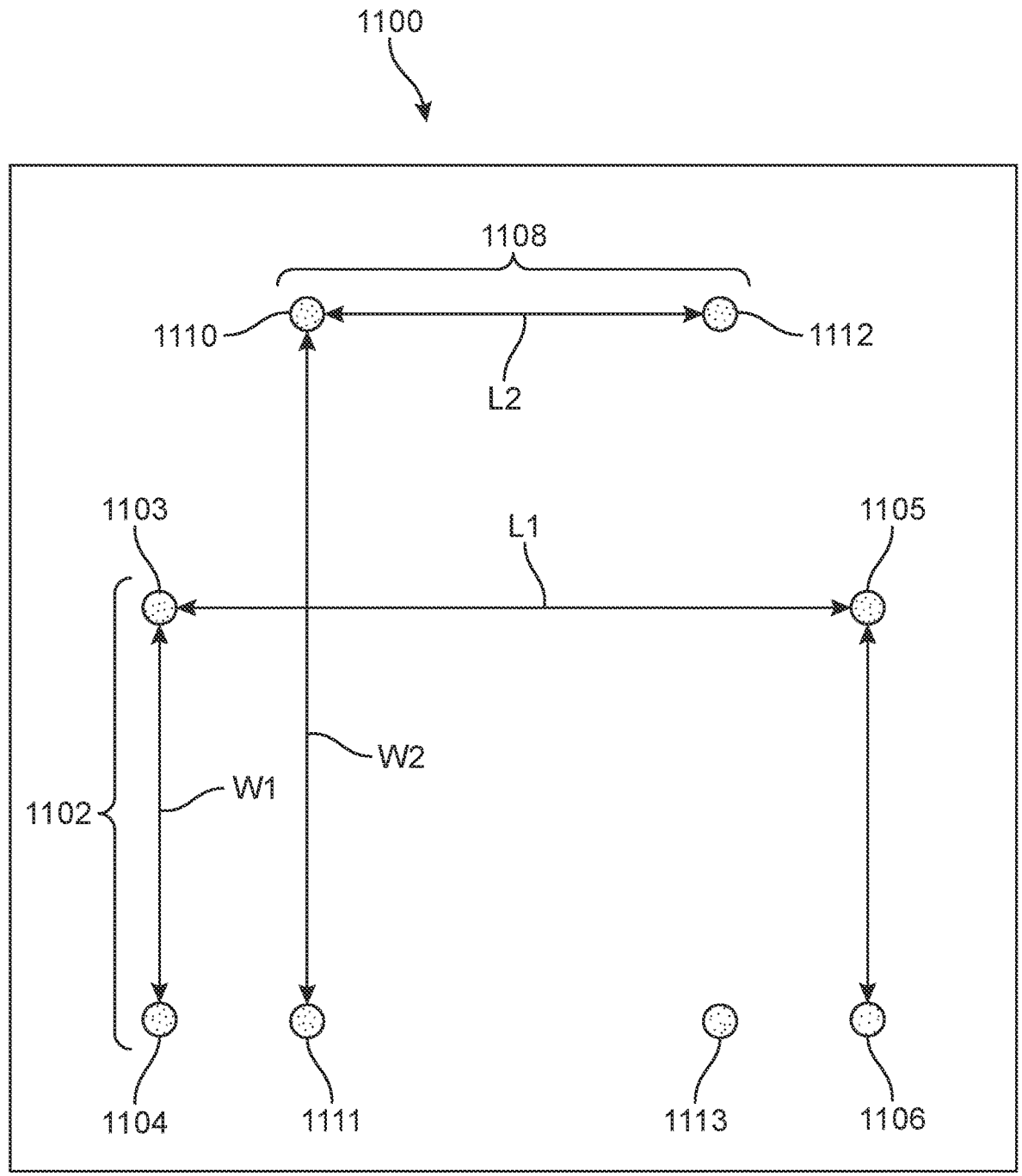
FIG. 11 is a representative view of another alternate embodiment of a charging mat having two sets of charging terminals with different orientations in accordance with aspects of the present disclosure.

FIG. 11 illustrates another alternate embodiment of a charging mat 1100 having two sets of charging terminals with different orientations. In this embodiment, charging mat 1100 is provided with two different sets of charging terminals that allow an electric scooter to be placed or stacked on charging mat 1100 in either a latitudinal orientation or a longitudinal orientation. For example, as shown in FIG. 11, a first set of charging terminals 1102 include a first terminal 1103, a second terminal 1104, a third terminal 1105, and a fourth terminal 1106 that are arranged with a latitudinal orientation on charging mat 1100. In this embodiment, first terminal 1103 and second terminal 1104 spaced apart by a first width (W1) and first terminal 1103 and third terminal 1105 are spaced apart by a first length (L1). Third terminal 1105 and fourth terminal 1106 are also spaced apart by first width (W1) and second terminal 1104 and fourth terminal 1106 are also spaced apart by first length (L1). In this embodiment, the latitudinal orientation of first set of charging terminals 1102 are configured so that an electric scooter may be placed on charging mat 1100 in a length-wise direction (as shown in FIG. 12).

A second set of charging terminals 1108 include a fifth terminal 1110, a sixth terminal 1111, a seventh terminal 1112, and an eighth terminal 1113 that are arranged with a longitudinal orientation on charging mat 1100. In this embodiment, fifth terminal 1110 and sixth terminal 1111 are spaced apart by a second width (W2) and fifth terminal 1110 and seventh terminal 1112 are spaced apart by a second length (L2). Seventh terminal 1112 and eighth terminal 1113 are also spaced apart by second width (W2) and sixth terminal 1111 and eighth terminal 1113 are also spaced apart by second length (L2). In this embodiment, the longitudinal orientation of second set of charging terminals 1108 are configured so that an electric scooter may be placed on charging mat 1100 in a width-wise direction (as shown in FIG. 13).

In an example embodiment, first length (L1) and first width (W1) of first set of charging terminals 1102 corresponds to the distances between the connection points of an electric scooter (e.g., connection points 118 of electric scooter 100) and second width (W2) and second length (L2) of second set of charging terminals 1108 also correspond to the distances between the connection points of the electric scooter (e.g., connection points 118 of electric scooter 100). In an example embodiment, first width (W1) is equal to second length (L2) and first length (L1) is equal to second width (W2). With this arrangement, an electric scooter may be placed onto charging mat 1100 in either a length-wise direction (as shown in FIG. 12) or a width-wide direction (as shown in FIG. 13). By providing two sets of charging terminals on charging mat 1100 a user may arrange one or more electric scooters in the cargo area of a vehicle in a manner that allows room for other objects or items in the cargo area.

Figure 12:
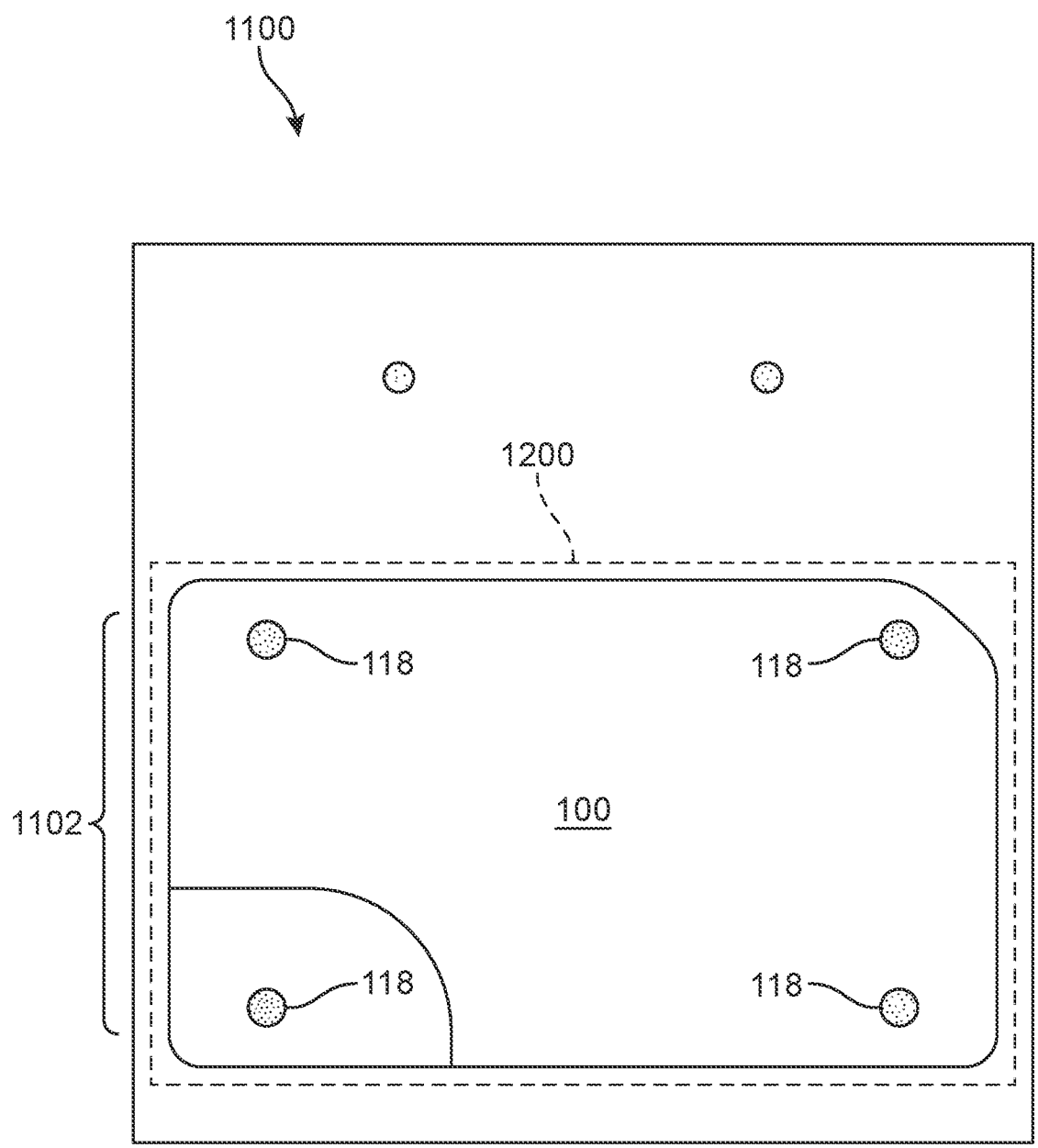
FIG. 12 is a representative view of the alternate embodiment of FIG. 11 charging an electric scooter using a first set of charging terminals in a latitudinal orientation in accordance with aspects of the present disclosure.

Referring now to FIG. 12, charging mat 1100 is shown with electric scooter 100 placed on charging mat 1100 in the length-wise direction so that first set of charging terminals 1102 having a latitudinal orientation 1200 are aligned with the connection points 118 of electric scooter 100. In some embodiments, charging mat 1100 may include an indicia of latitudinal orientation 1200 on the surface of charging mat 1100 to aid the user in placement of electric scooter 100.

Figure 13:
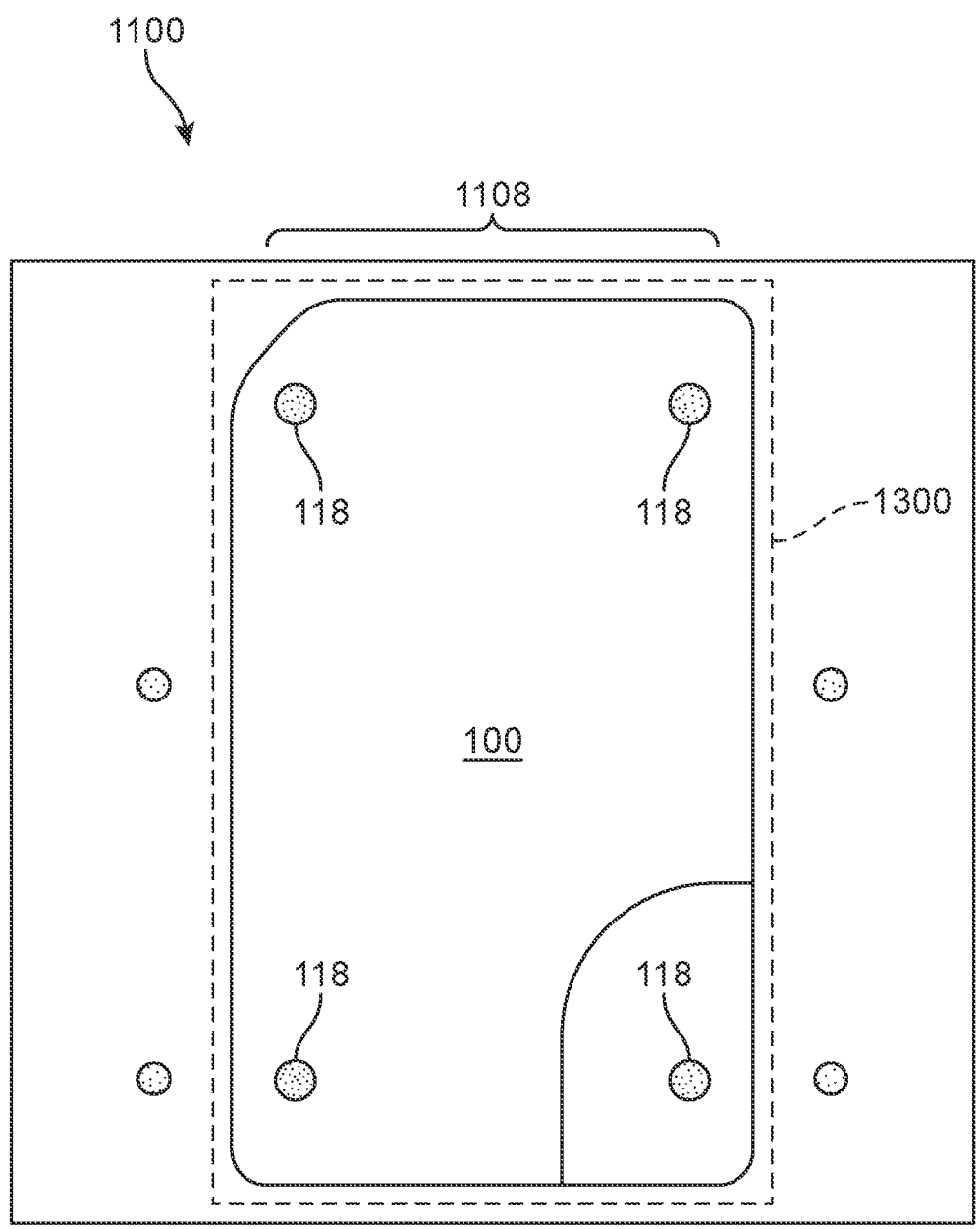
FIG. 13 is a representative view of the alternate embodiment of the charging mat of FIG. 11 charging an electric scooter using a second set of charging terminals in a longitudinal orientation in accordance with aspects of the present disclosure.

Referring now to FIG. 13, charging mat 1100 is shown with electric scooter 100 placed on charging mat 1100 in the width-wise direction so that second set of charging terminals 1108 having a longitudinal orientation 1300 are aligned with the connection points 118 of electric scooter 100. In some embodiments, charging mat 1100 may include an indicia of longitudinal orientation 1300 on the surface of charging mat 1100 to aid the user in placement of electric scooter 100.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. An electric transport device charging system, comprising:
   a charging mat including a plurality of charging terminals, wherein the plurality of charging terminals have a first shape;
   a plurality of electric transport devices, wherein each electric transport device has a pair of side surfaces including a plurality of connection points, the connection points on one of the side surfaces having a second shape that is configured to conform to the first shape of the plurality of charging terminals when the one of the side surfaces including the connection points having the second shape is facing towards the charging mat; and
   wherein a first electric transport device of the plurality of electric transport devices is configured to be placed on the charging mat with the plurality of charging terminals aligned with the connection points on one of the side surfaces having the second shape such that the connection points and the charging terminals fit into each other and such that the one of the side surfaces including the connection points having the second shape is on top of the charging mat.

2. The system according to claim 1, wherein at least a second electric transport device of the plurality of electric transport devices is configured to stack on top of the first electric transport device while the first electric transport device is on the charging mat.

3. The system according to claim 2, wherein the connection points on an opposite side surface of each electric transport device have the first shape; and
   wherein the second electric transport device of the plurality of electric transport devices is configured to be placed on top of the first electric transport device with the connection points having the first shape being aligned with the connection points having the second shape such that the connection points having the first shape fit into the connection points having the second shape.

4. The system according to claim 1, wherein the first shape and the second shape fit together so as to form a mechanical attachment through friction.

5. The system according to claim 1, wherein the first shape is a convex shape and the second shape is a concave shape.

6. The system according to claim 1, wherein each electric transport device of the plurality of electric transport devices is an electric scooter having a stowed configuration and a riding configuration; and
   wherein the electric scooters are configured to be placed on the charging mat while in the stowed configuration.

7. The system according to claim 1, wherein each electric transport device of the plurality of electric transport devices further includes a pass through tab having a switch moveable between a first position associated with a charging state configured to charge a battery of the electric transport device and a second position associated with a pass-through state configured to pass through electric via the connection points without charging the battery.

8. The system according to claim 1, wherein the charging mat includes two sets of charging terminals having different orientations, including a first set of charging terminals having a latitudinal orientation and a second set of charging terminals having a longitudinal orientation; and
   wherein the plurality of electric transport devices are configured to be stacked on the charging mat in a length-wise direction on the first set of charging terminals or in a width-wise direction on the second set of charging terminals.

9. The system according to claim 1, wherein the charging mat is located in a vehicle cargo area of a vehicle.

10. A method of charging and stacking a plurality of electric transport devices, the method including:
    providing a charging mat having a plurality of charging terminals, wherein the plurality of charging terminals have a first shape;
    placing two or more electric transport devices on top of the charging mat in a stacked arrangement, wherein each electric transport device has a pair of side surfaces including a plurality of connection points, the connection points on one of the side surfaces having a second shape that is configured to conform to the first shape of the plurality of charging terminals;

wherein placing the two or more electric transport devices on the charging mat includes:

aligning the plurality of charging terminals on the charging mat with the connection points of a first electric transport device located on one of the side surfaces having the second shape such that the connection points of the first electric transport device and the charging terminals fit into each other;

arranging the first electric transport device so that the one of the side surfaces including the connection points having the second shape is on top of the charging mat and the connection points are connected to the charging terminals of the charging mat; and stacking at least one additional electric transport device on top of the first electric transport device.

11. The method according to claim 10, wherein placing the two or more electric transport devices on the charging mat further includes placing the at least one additional electric transport device on top of the first electric transport device with the connection points having the first shape being aligned with the connection points having the second shape such that the connection points having the first shape fit into the connection points having the second shape.

12. The method according to claim 10, wherein the first shape and the second shape fit together so as to form a mechanical attachment through friction.

13. The method according to claim 10, wherein the first shape is a convex shape and the second shape is a concave shape.

14. The method according to claim 10, wherein each electric transport device of the two or more electric transport devices is an electric scooter having a stowed configuration and a riding configuration; and wherein the method includes placing each of the electric scooters on the charging mat while in the stowed configuration.

15. The method according to claim 10, wherein each electric transport device of the two or more electric transport devices further includes a pass through tab having a switch moveable between a first position associated with a charging state configured to charge a battery of the electric transport device and a second position associated with a pass-through state configured to pass through electric via the connection points without charging the battery.

16. The method according to claim 10, wherein the charging mat includes two sets of charging terminals having different orientations, including a first set of charging terminals having a latitudinal orientation and a second set of charging terminals having a longitudinal orientation; and wherein the method further comprises stacking the two or more electric transport devices on the charging mat in a length-wise direction on the first set of charging terminals or in a width-wise direction on the second set of charging terminals.

17. An electric transport device comprising:

an outer casing including a pair of side surfaces;

an onboard battery;

a front wheel and a rear wheel, at least one of the front wheel or the rear wheel including an electric motor;

a plurality of connection points located on each of the side surfaces of the outer casing, wherein the connection points on one side surface have a first shape and the connection points on the opposite side surface have a second shape that is configured to conform to the first shape such that the first shape and the second shape fit into each other; and wherein the onboard battery is electrically connected to the connection points so as to be charged when the connection points on at least one of the side surfaces are in contact with a charging source.

18. The electric transport device according to claim 17, further comprising:

a storage compartment located inside the outer casing between the pair of side surfaces; and an auxiliary charging port accessible from the storage compartment, the auxiliary charging port being configured to charge a mobile device when the mobile device is located inside the storage compartment.

19. The electric transport device according to claim 17, further comprising:

a pass-through tab located on a side of the outer casing, the pass-through tab having a switch moveable between a first position associated with a charging state configured to charge the onboard battery of the electric transport device and a second position associated with a pass-through state configured to pass through electric via the connection points without charging the onboard battery.

20. The electric transport device according to claim 17, wherein the first shape is a convex shape and the second shape is a concave shape.

* * * * *